United States Patent [19]

Morehead

[11] Patent Number: 4,933,421
[45] Date of Patent: Jun. 12, 1990

[54] EPOXY RESIN COMPOSITION CONTAINING METAL TETRAFLUOROBORATE AND BORON ESTER

[75] Inventor: Glen T. Morehead, Houston, Tex.

[73] Assignee: Shell Oil Company, Houston, Tex.

[21] Appl. No.: 330,517

[22] Filed: Mar. 30, 1989

[51] Int. Cl.$^5$ ............................................ C08G 59/72
[52] U.S. Cl. ..................................... 528/91; 525/502; 525/506; 525/523; 525/529; 525/532
[58] Field of Search ................. 528/91; 525/523, 529, 525/530

[56] References Cited

U.S. PATENT DOCUMENTS

| | | | |
|---|---|---|---|
| 2,953,545 | 9/1960 | Finestone | 528/91 |
| 3,018,262 | 1/1962 | Schroeder | 523/402 |
| 4,092,296 | 5/1978 | Skiff | 260/47 |
| 4,379,908 | 4/1983 | Brownscombe | 528/91 |
| 4,447,586 | 5/1984 | Shimp | 525/504 |
| 4,565,837 | 1/1986 | Drain | 523/400 |
| 4,628,080 | 12/1986 | Corley | 528/88 |
| 4,791,154 | 12/1988 | Corley et al. | 523/456 |

FOREIGN PATENT DOCUMENTS

| | | | |
|---|---|---|---|
| 653000 | 11/1962 | Canada | 401/16 |
| 694710 | 9/1964 | Canada . | |
| 0694710 | 9/1964 | Canada . | |
| 381731 | 3/1963 | Japan . | |
| 907590 | 2/1982 | U.S.S.R. . | |
| 776213 | 6/1957 | United Kingdom . | |
| 843233 | 8/1960 | United Kingdom . | |
| 0894037 | 4/1962 | United Kingdom | 528/91 |
| 0928835 | 6/1963 | United Kingdom | 528/91 |
| 1069438 | 5/1967 | United Kingdom | 528/91 |

*Primary Examiner*—John C. Bleutge
*Assistant Examiner*—Robert E. L. Sellers II

[57] ABSTRACT

Rapid-setting epoxy resins comprise a polyepoxide, a metal tetrafluoroborate, and at least one boron ester selected from the group of triesters of boric acid and diesters of boronic acid.

16 Claims, No Drawings

EPOXY RESIN COMPOSITION CONTAINING METAL TETRAFLUOROBORATE AND BORON ESTER

FIELD OF THE INVENTION

The present invention relates to rapid-setting epoxy resins and their use as adhesives.

BACKGROUND OF THE INVENTION

Epoxy resins, optionally containing reactive diluents, are known to be cured with metal tetrafluoroborates, which can be used as the commercially available aqueous solutions thereof.

There is a need for faster curing of epoxy resins but it is desirable for some applications that this faster curing take place in the presence of water because of the use of the metal tetrafluoroborate in an aqueous solution. Thus, there are special needs in the epoxy resin art which this invention addresses.

SUMMARY OF THE INVENTION

The present invention is directed to a curable compositon comprising a polyepoxide, a metal tetrafluoroborate, and at least one boron ester selected from the group consisting of triesters of boric acid and diesters of boronic acid. These compositions can be formulated to cause extremely rapid cure while retaining the performance advantages of epoxy resins, such as heat resistance and solvent resistance. The invention can provide these advantages using room temperature or elevated temperature cure schedules.

Polyepoxides

The polyepoxides used to prepare the present compositions comprise those compounds containing at least one vicinal epoxy group, i.e., at least one

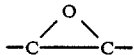

group. These polyepoxides may be saturated or unsaturated, aliphatic, cycloaliphatic, aromatic or heterocyclic and may be substituted if desired with non-interfering substituents such as halogen atoms, hydroxyl groups, ether groups, and the like. They may also be monomeric or polymeric.

For clarity, many of the polyepoxides and particularly those of the polymeric type are described in terms of epox equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. Nos. 3,356,624, 3,408,219, 3,446,762, and 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 to about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols o by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241. The hydrogenated epoxy compounds prepared by the process disclosed in U.S. Pat. No. 3,336,241 are suitable for use in the present compositions and the disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol) propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenyl)propane, sometimes called the diglycidyl ethers of 2,2-bis(4-cyclohexanol)propane.

Other examples of suitable polyepoxides include the glycidyl ethers of novolac resins, i.e., phenolic-aldehyde condensates, including those from phenol, cresol and the like. Preferred resins of this type are those disclosed in U.S. Pat. No. 2,658,885.

For most applications it is desirable to utilize an epoxy resin which is liquid or semi-liquid under the conditions of application. Accordingly, a blend of a liquid and solid epoxy resin can be employed or suitable conventional epoxy resin diluents known in the art, including unsaturated aromatic monomers, (methyl)acrylates of polyols and the like. For some applications, a solid resin may be employed.

UNSATURATED AROMATIC MONOMERS

Examples of unsaturated aromatic monomers include the vinyl aromatic monomers of up to about 14 carbon atoms including one or two aryl or heteroaryl rings, such as styrene; alpha-methylstyrene; vinyl toluene or p-methyl styrene; alkyl halo- and nitro-substituted styrenes such as chlorostyrene, bromostyrene, nitrostyrene; divinylbenzene, tertiary-butylstyrene; 2-vinyl pyridine; and vinyl naphthalene. Mixtures of unsaturated aromatic monomers may be employed. The preferred vinyl aromatic monomer is styrene. A very preferred mixture comprises styrene and divinylbenzene.

Polyacrylate or Polymethacrylate Esters of Polyols

Preferred comonomers include the polyacrylate and polymethacrylate esters of polyols containing more than one terminal acrylate or methacrylate group. These esters are the acrylic and methacrylic acid esters of aliphatic polyhydric alcohols such as, for example, the di- and polyacrylates and the di- and polymethacrylates of alkylene glycols, polyoxyalkylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are neopentyl glycol dimethacrylate, trimethylolpropane trimethacrylate, trimethylolpropane triacrylate, pentaerythritol triacrylate, and 1,3-butylene dimethacrylate.

Additional acrylate or methacrylate esters of polyols are the acrylate or methacrylate esters of epoxide resins, wherein epoxide resins as used herein are considered to be polyols. The epoxide resins useful in reacting with acrylic or methacrylic acid are those epoxide resins described hereinbefore. The procedures for preparing these acrylate and methacrylate esters of epoxide resins are described in U.S. Pat. No. 3,377,406 which is hereby incorporated by reference.

Usable blends of the polyepoxide and diluent components will vary depending upon the nature of the polyepoxide used and the desired system viscosity. These ranges of component amounts are shown below in percent by weight total composition:

|  | Suitable Range | Preferred Range | More Preferred Range |
|---|---|---|---|
| Polyepoxide | 99 to 25 | 98 to 50 | 95 to 65 |
| Aromatic Monomer(s) | 1 to 75 | 1 to 75 | 2.5 to 17.5 |
| Multifunctional Acrylic/ Methacrylic Monomer | 0 to 75 | 1 to 25 | 2.5 to 17.5 |

Preferably, the parts by weight of multifunctional monomer should be equal to or less than the parts by weight of aromatic monomer, especially to give a ratio of the respective amounts of from about 1:1 to 1:5 or greater, preferably about 1:2.

Free Radical Curing Agents

Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, Tetralin hydroperoxide, phenylcyclohexane hydroperoxide, tertiary butyl peracetate, dicumyl peroxide, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisobutyramide, and the like. Particularly preferred catalysts include the dialkyl peroxides, tertiary alkyl hydroperoxides, alkyl esters of peroxycarboxylic acids and particularly those of the above noted groups which contain no more than 18 carbon atoms per molecule and which have a half-life of at least one hour at 125° C.

An especially useful peroxide is 2,5-dimethyl-2,5-bis(-tertiary-butylperoxy) hexane.

It will be appreciated that the amoun of free-radical catalyst (curing agent) will vary over a broad range depending upon the amount of the particular vinyl monomer used, type of peroxide and end-use properties, etc. In general, an effective or curing amount is employed. One skilled in the art would simply adjust the amounts of a particular peroxide to suit his process conditions. Such adjustments are made in one or two runs knowing the temperatures, half-lives, etc.

Metal Tetrafluoroborate

An essential component of the present invention is the metal tetrafluoroborate. The use of the metal tetrafluoroborate enables rapid cure at high temperature with often relatively long pot life at room temperature without water-sensitive anhydrides or toxic amines.

The preferred group of metal tetrafluoroborates includes those of lithium, magnesium, calcium, aluminum, iron, cobalt, nickel, copper, zinc, tin, antimony, cadmium, lead and bismuth. A much preferred group of metal tetrafluoroborates comprise those of copper, iron, zinc, nickel, tin and aluminum, with copper tetrafluoroborate being most preferred.

The amount of metal tetrafluoroborate employed in the compositions of the invention is about 0.2 to about 10 parts by weight metal tetrafluoroborate per 100 parts by weight polyepoxide, preferably about 1 to about 5 parts by weight per 100 parts by weight polyepoxide. A small amount (less than 10% by weight of metal tetrafluoroborate solution) of an amine or an inorganic base may be added to the metal tetrafluoroborate solution to neutralize excess acid and increase the pot life. However, the amount of amine, if any, added will be far less than that required to cure the epoxy resin by stoichiometric amine-epoxy reactions of the type used in U.S. Pat. Nos. 4,389,515 and 4,397,998.

The metal tetrafluoroborate can be added neat or, preferably, is used as a solution in water, organic solvents or mixtures thereof. Suitable organic solvents include alcohols, glycols, glycol ethers, ketones, sulfoxides, amides and the like. Preferred are polyalkylene glycols or polyalkylene ether glycols having an average molecular weight of from about 200 to about 1,500, and especially a polyethylene glycol or polypropylene glycol having an average molecular weight of between about 400 to about 1,000. Polyethylene glycol having an average molecular weight of about 400 (PEG-400) is preferred.

The amount of polyalkylene glycol or polyalkylene ether glycol or other solvent will depend somewhat on the particular epoxy resin and/or metal tetrafluoroborate used. The amount will generally be from about 10 to about 500 weight % based on the weight of the metal tetrafluoroborate or expressed alternatively, as from about 0.001 to about 9 weight % based on the weight of the epoxy resin.

The solution of metal tetrafluoroborate can also contain a surfactant. The surfactant is suitably nonionic surfactant such as those of the formula

in which n is 2 or 20 and R is $C_6$ to $C_{30}$ alkyl, cycloakyl, alkaryl or aralkyl. The surfactant can be present in an amount within the range of about 0.01 to about 10 weight % based on the weight of the epoxy resin, preferably from about 0.5 to about 5 weight % based on the epoxy resin.

Boron Esters

The boron esters which form a part of the curing catalyst system of this invention are the esters of boric acid and the esters of the boronic acids.

The esters of boric acid are referred to as borates and are well known in the art. The borates include those materials having the formula

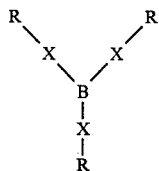

where each X is independently O or S; and where each R is independently an alkyl group including, for example, methyl, ethyl, propyl, isopropyl, butyl or isobutyl; a cycloalkyl group including, for example, cyclohexyl; or an aryl group including, for example, benzyl, phenyl and methylphenyl. These groups can contain up to about 14 carbon atoms. Three different groups can be present in a single borate.

Representative examples of borates include ethyl borate, n-propyl borate, butyl borate, cyclohexyl borate, tri-m- or tri-p-cresyl borate and isopropyl borate or the thio analogs thereof.

Polyborate esters, compounds which contain at least two boron atoms can also be employed to form a part of the curing catalyst system of this invention. Examples of polyborate esters are trihexylene glycol biborate, tri(octylene glycol) biborato, and hexylene glycol biborate.

The esters of the boronic acids are referred to as boronates and are well known in the art. The boronates include those materials having the structural formula

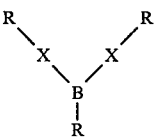

where each X is independently O or S; and where each R is independently an alkyl group including, for example, methyl, ethyl, propyl, isopropyl, butyl and isobutyl; a cycloalkyl group including, for example, cyclohexyl; or an aryl group including, for example, benzyl, phenyl and methylphenyl. These groups can contain up to about 14 carbon atoms. Three different groups can be present in a single boronate.

Representative examples of boronates include n-propyl methaneboronate, n-butyl benzeneboronate, ethyl methaneboronate, n-propyl benzeneboronate, and n-propyl ethaneboronate and the thio analogs thereof.

Representative boron esters and their preparation are disclosed in Canadian Pat. Nos. 653,000 and 694,710.

The effective amount of ingredients in compositions of the invention will, of course, depend on the particular ingredients used and the specific use intended for the composition. Suitable compositions of the invention include those comprising:

(1) about 99.6 to about 80 percent by weight of polyepoxide or diluted polyepoxide system, preferably, about 98 to about 90;

(2) about 0.2 to about 10 percent by weight of a metal tetrafluoroborate, preferably about 1 to about 5 and (3) about 0.2 to about 10 percent by weight of at least one boron ester, preferably about 1 to about 5.

The present compositions may be utilized in man applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or cloth an the material formed into the desired object and cured.

ILLUSTRATIVE EMBODIMENTS

The following examples are given to illustrate the preparation of the rapidly curable thermosetting compositions an their utility comparative to other epoxy resin formulations. It is understood that the examples are embodiments only and are given for the purpose of illustration and the invention is not to be regarded as limited to any specific components and/or specific conditions recited therein. Unless otherwise indicated, parts and percentages in the examples are parts and percentages by weight, i.e., phr is parts weight per hundred parts by weight of resin.

EPON ® Resin 826 is a liquid glycidyl polyether of 2,2-bis (4-hydroxyphenyl)propane having an epoxide equivalent weight of 175–190 and an average molecular weight of about 360.

Comparative Experiment

A resin mixture was prepared by blending 100 parts of EPON Resin 826, 4 parts of styrene, 2 parts of commercial 55% divinylbenzene, and 0.4 parts of Lupersol 101 (2,5-bis-(t-butylperoxy)-2,5-dimethylhexane) until homogeneous.

A curing agent mixture was prepared as follows. Commercial 45% aqueous Cu(BF$_4$)$_2$ solution (3000 g) was placed in a beaker and 12 grams of 50% aqueous KOH was added with stirring to neutralize excess acid. A 2897 g portion of the resultant mixture was mixed with 1713.7 grams of polyethylene glycol 400 in a 5-liter flask. The temperature of the mixture was raised to 75°–110° C. and most of the water was removed under vacuum over a period of about 100 minutes. The product solution was blended with another lot prepared by the same procedure and the blended product curing agent solution had a water content of 14.65% by Karl Fischer analysis.

The above resin mixture (1100 g) was mixed with 28.93 grams (2.63 phr) of the above curing agent mixture at 21° C. The mixture gelled and rose rapidly in temperature after 65–70 minutes had elapsed, reaching a peak temperature of 291° C. after 71 minutes.

EXAMPLE 1

The resin mixture of the Comparative Experiment (400 g) was mixed with 15 g (3.75 phr) of Borester 8 (a mixed cresyl borate produced from m- and p-cresol by U.S. Borax Research). This mixture was then mixed with 10.52 g (2.63 phr) of the curing agent mixture from the Comparative Experiment. The resultant mixture gelled and strongly exothermed within less than one minute.

The above procedure was subsequently repeated on a smaller scale. Fifty grams of the resin mixture from the Comparative Experiment were mixed with 1.9 g (3.8 phr) of Borester 8 and then with 1.3 g (2.6 phr) of the curing agent mixture from the Comparative Experiment. The mixture exothermed and cured to a hard mass within 75 seconds.

Addition of 1 g of Borester 8 to 1 g of water or of 1 g of Borester 8 to 1 g of the curing agent mixture from the Comparative Experiment produced no exotherm.

The experiments of this example show the strong acceleration by Borester 8 of the copper tetrafluoroborate cure of the epoxy. Since the experiments in Example 1 were done on a smaller scale than the experiment in the Comparative Experiment, one would expect cure to be slower in Example 1 than in the Comparative Experiment because heat diffuses out of a smaller sample more rapidly. The Borester 8, however, greatly increased the cure rate of the system even at small sample size.

What is claimed is:

1. A curable composition comprising a polyepoxide; a metal tetrafluoroborate; and at least one boron ester selected from the group consisting of triesters of boric acid and diesters of boronic acid.

2. The composition according to claim 1 wherein the polyepoxide is a glycidyl polyether of a polyhydric phenol.

3. The composition according to claim 2 wherein the polyhydric phenol is 2,2-bis(4-hydroxyphenyl)propane.

4. The composition according to claim 1 wherein the polyepoxide is a novolac resin.

5. The composition according to claim 1 wherein the polyepoxide is a saturated epoxy resin.

6. The composition according to claim 1 wherein the metal tetrafluoroborate is selected from those of lithium, magnesium, calcium, aluminum, iron, cobalt, nickel, copper, zinc, tin, antimony, cadmium, lead or bismuth.

7. The composition according to claim 1 wherein the metal tetrafluoroborate is selected from the group consisting of the tetrafluoroborates of copper, iron, zinc, nickel, tin, and aluminum.

8. A curable composition comprising a polyepoxide, copper tetrafluoroate; and at least one boron ester selected from the group consisting of triesleve of boric and diesters of boronic acid.

9. The composition according to claim 1 wherein the boron ester is a triester of boric acid.

10. The composition according to claim 9 wherein the boron ester is a triaryl borate.

11. The composition according to claim 10 wherein the boron ester is a mixed cresyl borate.

12. The composition according to claim 2 wherein the metal tetrafluoroborate is of copper, iron, zinc, nickel, tin or aluminum, the boron ester is a triaryl borate and the composition als contains at least one unsaturated aromatic monomer and a peroxide free radical curing agent.

13. The composition according to claim 3 wherein the metal tetrafluoroborate is of copper, iron, zinc, nickel, tin or aluminum, the boron ester is a triaryl borate and the composition also contains at least one unsaturated aromatic monomer and a peroxide free radical curing agent.

14. The composition according to claim 13 wherein the metal tetrafluoroborate is copper tetrafluoroborate, the aromatic monomer is a mixture of styrene and divinylbenzene and the peroxide is 2,5-bis(tertiarybutylperoxy)-2,5-dimethylhexane.

15. The composition of claim 1 wherein the composition comprises:
   (1) about 99.6 to about 80 percent by weight of polyepoxide or diluted polyepoxide system;
   (2) about 0.2 to about 10 percent by weight of a metal tetrafluoroborate; and
   (3) about 0.2 to about 10 percent by weight of at least one boron ester.

16. The composition according to claim 2 wherein the composition comprises:
   (1) about 99.6 to 80 percent by weight of a glycidyl polyether of a polyhydric phenol;
   (2) about 0.2 to 10 percent by weight of a metal tetrafluoroborate;
   (3) about 0.2 to 10 percent by weight of at least one boron ester.

* * * * *